(12) United States Patent
Strong

(10) Patent No.: US 6,789,810 B2
(45) Date of Patent: Sep. 14, 2004

(54) INTEGRATED WHEEL SUSPENSION SYSTEM

(76) Inventor: Russell W. Strong, 410 S. Pitkin Rd., Craftabury Common, VT (US) 05827

( * ) Notice: Subject to any disclaimer, the term of this patent is extended or adjusted under 35 U.S.C. 154(b) by 0 days.

(21) Appl. No.: 10/173,320

(22) Filed: Jun. 17, 2002

(65) Prior Publication Data

US 2002/0190492 A1 Dec. 19, 2002

Related U.S. Application Data

(60) Provisional application No. 60/298,724, filed on Jun. 15, 2001.

(51) Int. Cl.$^7$ .............................. B60G 3/12; B60G 7/00; B60G 15/00
(52) U.S. Cl. ........................ 280/124.128; 280/124.153; 280/124.154; 16/18 R; 16/44
(58) Field of Search ................... 280/124.128, 124.153, 280/124.154, 855; 16/18 R, 20, 22, 23, 38, 31 R, 31 A, 41, 18 B, 44

(56) References Cited

U.S. PATENT DOCUMENTS

| | | | | |
|---|---|---|---|---|
| 985,492 A | * | 2/1911 | Arbeiter | 16/41 |
| 1,150,883 A | * | 8/1915 | Porter, Sr. | 16/41 |
| 1,237,507 A | * | 8/1917 | Gregory | 16/44 |
| 1,689,747 A | * | 10/1928 | Olson | 280/855 |
| 1,757,771 A | * | 5/1930 | Ideus | 280/855 |
| 1,889,939 A | * | 12/1932 | Thomas | 280/124.128 |
| 1,958,905 A | * | 5/1934 | Anderson | 280/124.128 |
| 1,982,853 A | * | 12/1934 | Brainard | 280/124.153 |
| 2,033,298 A | * | 3/1936 | Pribil | 16/44 |
| 2,087,299 A | * | 7/1937 | Pribil | 16/44 |
| 2,271,304 A | * | 1/1942 | Mulholland | 16/44 |
| 2,325,822 A | * | 8/1943 | Whitmer | 280/476.1 |
| 2,376,001 A | * | 5/1945 | Nogle | 16/44 |
| 2,525,506 A | * | 10/1950 | Wiedman | 280/124.128 |
| 2,543,948 A | * | 3/1951 | Wiedman | 16/44 |
| 2,564,996 A | * | 8/1951 | Rasbach | 16/44 |
| 2,568,261 A | * | 9/1951 | Stade | 16/44 |
| 2,582,716 A | * | 1/1952 | Nelson | 16/44 |
| 2,643,892 A | * | 6/1953 | Fletcher et al. | 16/44 |
| 2,770,832 A | | 11/1956 | Martin | |
| 2,799,515 A | * | 7/1957 | Lobozzo | 280/855 |
| 2,831,545 A | * | 4/1958 | Christiano | 280/124.128 |
| 2,891,764 A | * | 6/1959 | Pearne | 16/44 |
| 3,174,771 A | * | 3/1965 | Muller | 280/124.153 |
| 3,214,786 A | * | 11/1965 | Butsch | 16/41 |
| 3,222,708 A | * | 12/1965 | Butsch | 16/41 |
| 3,464,714 A | * | 9/1969 | Prillinger | 280/855 |
| 3,479,049 A | | 11/1969 | Duecy | |
| 3,518,714 A | | 7/1970 | Hager | |
| 3,672,701 A | | 6/1972 | Blank | |
| 3,817,548 A | | 6/1974 | De Puydt et al. | |
| 3,868,745 A | * | 3/1975 | Jamison | 16/41 |
| 3,924,292 A | | 12/1975 | Christensen | |
| 4,043,571 A | * | 8/1977 | Guerbet | 280/124.153 |
| 4,078,821 A | | 3/1978 | Kitterman | |
| 4,248,445 A | | 2/1981 | Vassar | |
| 4,353,567 A | | 10/1982 | Weldy | |

(List continued on next page.)

Primary Examiner—Darren W. Ark
(74) Attorney, Agent, or Firm—Artz & Artz, PC

(57) ABSTRACT

A wheel suspension system for a vehicle includes a vehicle wheel having a wheel rim and a tire secured to the wheel rim. The wheel is secured to a frame portion of the vehicle by a spindle assembly. The spindle assembly includes a wheel carrier arm pivotally secured thereto at a pivot point, such that the wheel and the wheel carrier arm rotate together about an axis of rotation defined by pivot point. The wheel carrier arm is in communication with a shock absorption device. The shock absorption device is located within a space defined by the wheel, such that the shock absorption spring device is hidden when the vehicle wheel is viewed from a side direction. The shock absorption spring device compresses upon an impact force contacting the vehicle wheel. In the most compact form, the wheel carrier arm and the shock absorbing spring device is packaged within the wheel rim volume such that both are hidden when the vehicle wheel is viewed from a front direction.

22 Claims, 6 Drawing Sheets

U.S. PATENT DOCUMENTS

| | | | |
|---|---|---|---|
| 4,372,569 A | | 2/1983 | Otterson |
| 4,449,725 A | | 5/1984 | Robison et al. |
| 4,511,155 A | | 4/1985 | Galloway |
| 4,645,230 A | | 2/1987 | Hammons |
| 4,685,174 A | | 8/1987 | Hager |
| 4,818,040 A | * | 4/1989 | Mezzancella et al. ........ 280/855 |
| 4,821,369 A | * | 4/1989 | Daniels ........................... 16/44 |
| 4,821,833 A | | 4/1989 | Yamaguchi |
| 4,834,412 A | | 5/1989 | Trema |
| 5,066,030 A | * | 11/1991 | Brett et al. .................... 280/92 |
| 5,103,530 A | * | 4/1992 | Andrisin et al. ................ 16/44 |
| 5,184,373 A | | 2/1993 | Lange |
| 5,228,522 A | | 7/1993 | Stufflebeam et al. |
| 5,347,680 A | * | 9/1994 | Rippe ............................. 16/44 |
| 5,590,605 A | | 1/1997 | Salter et al. |
| 5,607,030 A | | 3/1997 | Swift et al. |
| 5,785,154 A | | 7/1998 | Chen |
| 5,797,611 A | | 8/1998 | Joseph et al. |
| 5,895,063 A | * | 4/1999 | Hasshi et al. ......... 280/124.134 |
| 5,967,535 A | * | 10/1999 | King ........................ 280/47.38 |
| 6,050,008 A | | 4/2000 | Doornek et al. |
| 6,070,701 A | | 6/2000 | Hu |
| 6,234,507 B1 | | 5/2001 | Dickie et al. |
| 6,241,262 B1 | * | 6/2001 | Suess .................. 280/124.128 |
| 6,286,857 B1 | * | 9/2001 | Reese et al. .......... 280/124.128 |
| 6,357,793 B1 | * | 3/2002 | Dickie et al. ......... 280/124.128 |
| 6,568,030 B1 | * | 5/2003 | Watanabe et al. ............... 16/44 |

* cited by examiner

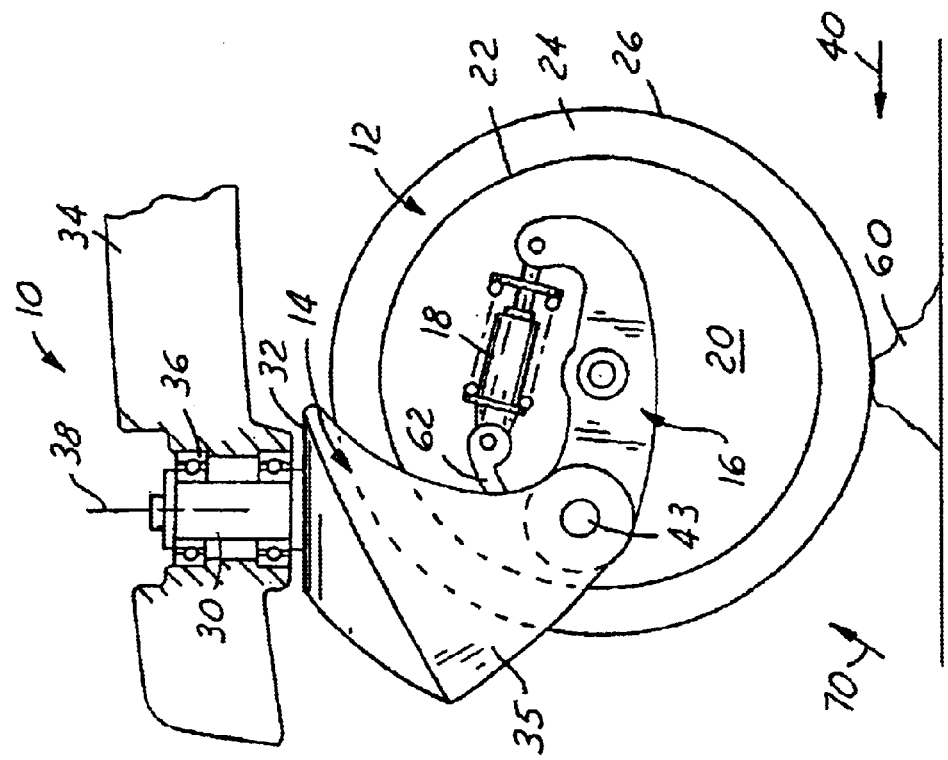
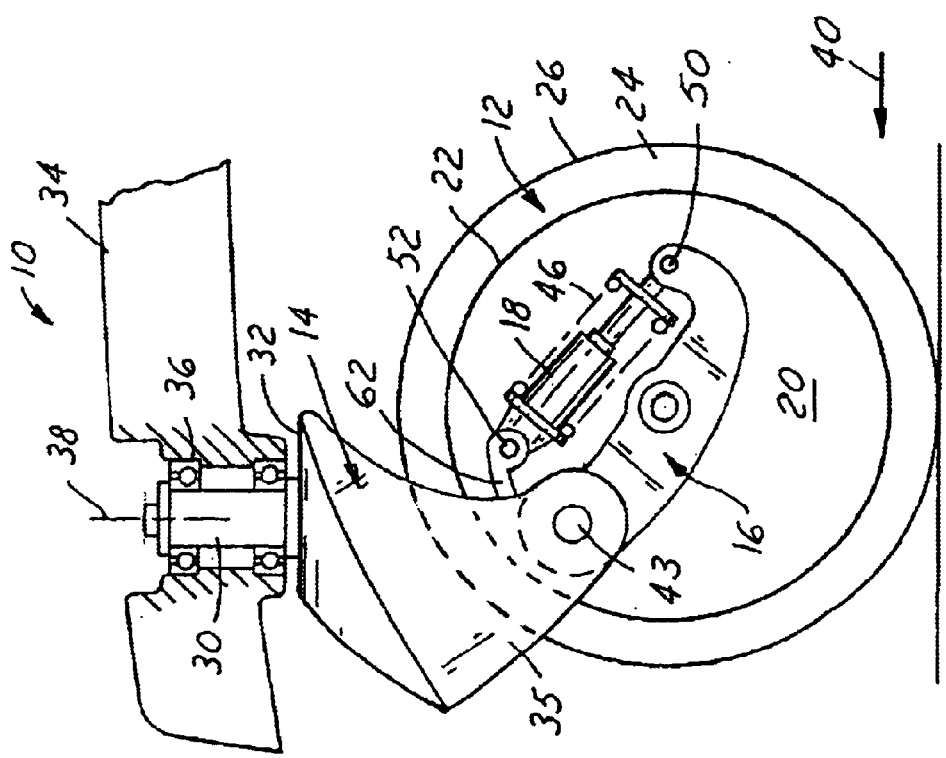

INTEGRATED WHEEL SUSPENSION SYSTEM

CROSS-REFERENCE TO RELATED APPLICATIONS

The present invention claims priority from U.S. Provisional Application Serial No. 60/298,724, entitled "Dolly Wheel Assembly With An Integrated Suspension," filed Jun. 15, 2001.

TECHNICAL FIELD

The present invention relates generally to a wheel assembly with an integrated suspension for use in a variety of all terrain and high speed applications with the integrated suspension being configured to allow the wheel assembly to move upwardly and rearwardly in response to an impact force. More specifically, the present invention relates to dolly wheels for use with a vehicle that provides maneuverability resulting in what is termed zero turn capability. The present invention also offers advantages when related to vehicle wheels, including both fixed position and steered.

BACKGROUND OF THE INVENTION

Dolly wheels are commonly used on vehicles or other devices which operate at low speeds (0–10 m.p.h.) as well as on industrial trucks and dollies and other equipment where it is advantageous to have zero turn capabilities. The wheels on such dolly wheel suspensions are subjected to relatively high impact forces when they engage an obstruction. These impact forces typically increase as a function of increasing speed and weight or load and operation in rough surface engagement conditions.

Shock absorbing dolly wheel suspensions, which help reduce the transmission of impact forces from the ground engaging wheels to the vehicle load, or load supported thereby, currently exit. Many of these shock absorbing dolly wheel suspension systems utilize a variety of springs attached to different support members to minimize the effect of impact forces that are encountered by the dolly wheels on the vehicles. While these dolly wheel suspension systems provide satisfactory performance, they normally require a relatively large devoted envelope within which to locate the suspension within the vehicle. This large devoted envelope requires structuring the vehicle to accommodate the larger suspension, which thus increases the overall cost of the vehicle. There are also dolly wheel systems that use a short spring or elastomeric compression component to dampen impact loads. However, while compact in size, these systems are relatively limited in suspension travel and travel dampening characteristics that are generally accomplished with a shock absorber utilized within a larger system.

Further, suspension systems for vehicle wheels of the non-dolly wheel type have been developed with a variety of different configurations. These suspension systems are incorporated into a variety of different vehicles, including automobile, motorcycle and the like. Current suspension systems are typically configured such that they are located inwardly of the vehicle wheel and their components move generally along the axis of the wheel. Because these suspension systems are located inwardly of the vehicle wheel, they require a relatively large amount of space. These suspension systems provide satisfactory performance. However, the amount of space required to accommodate the suspension system is disadvantageous for many uses.

It would thus be advantageous to provide a dolly wheel suspension system that provides significant travel, and requires significantly less space without sacrificing performance. It would also be advantageous to provide a suspension system for a fixed location wheel or a wheel of steering capability that requires significantly less space without sacrificing performance.

SUMMARY OF THE INVENTION

It is therefore an object of the present invention to provide a wheel suspension system for a vehicle that will effectively absorb the shocks incident to travel of the vehicle over irregular road surfaces.

It is another object of the present invention to provide a dolly wheel suspension system in which the dolly wheel is mounted for generally up and down movements as it encounters irregularities in road surface and is arranged with a spring and shock absorber to yieldably resist upward movement of the wheel and to absorb road shocks resulting in the minimum upward component of movement of the vehicle itself.

It is yet another object of the present invention to provide a wheel suspension system that can be packaged in a much smaller area within a vehicle than prior suspension systems.

It is a related object of the present invention to provide a wheel suspension system that can be utilized with dolly wheels having zero turn capabilities.

It is still a further object of the present invention to provide a dolly wheel suspension system that includes the full shock absorption and spring action that is currently present in existing automotive vehicles.

It is still another object of the present invention to provide a suspension system for a fixed location wheel, a controlled steered wheel of a vehicle, or an unrestrained dolly wheel that is fully integrated within the rim of the wheel.

In accordance with the above and the other objects of the present invention, a wheel suspension system is provided. In the case of a dolly wheel, the suspension system includes a dolly wheel, a wheel carrier arm, and a dolly wheel spindle rotationally secured to a frame element of the vehicle. The dolly wheel spindle has a generally vertical axis of rotation and the wheel carrier arm and the dolly wheel rotate about the axis of rotation. The wheel carrier arm is rotatably secured to the dolly wheel spindle and acts as a swing arm for the dolly wheel. The wheel carrier arm has a first end that is pivotally secured to the dolly wheel spindle and extends downwardly from the pivot point defined by the connection of the wheel carrier arm to the dolly wheel spindle. The wheel carrier arm has a method for rotatably mounting the dolly wheel being generally located in its mid body. The wheel carrier arm has a second end that is remote from the first end with the second end being secured to a first end of a shock absorber. The wheel carrier arm is moveable about the pivot point thereby compressing or extending the shock absorber. The shock absorber incorporates a spring and is rotatably secured at a second end to an extending arm of the dolly wheel spindle. The dolly wheel has an outer periphery and the shock absorber is located within an area defined by the outer periphery of the dolly wheel to minimize the space needed for the suspension system.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 4 is a schematic side view of a dolly wheel suspension system in accordance with another preferred embodiment of the present invention;

FIG. 5 is a schematic side view of the dolly wheel suspension system of FIG. 4 illustrating the operation of the suspension system when the wheel is subjected to an impact force in accordance with a preferred embodiment of the present invention;

DETAILED DESCRIPTION OF THE PREFERRED EMBODIMENT

Figure 1:
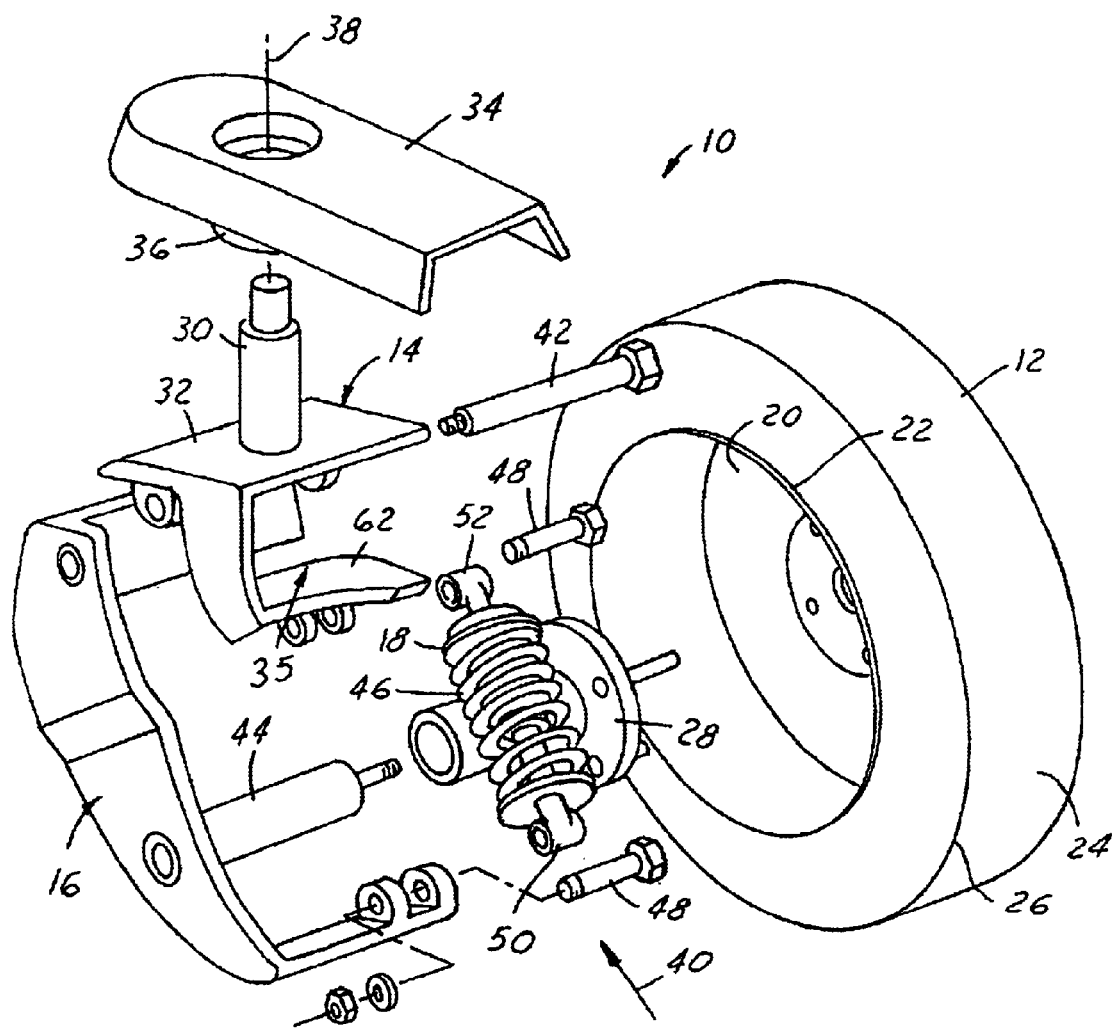
FIG. 1 is an exploded view of a wheel suspension system in accordance with a preferred embodiment of the present invention.
Figure 2:
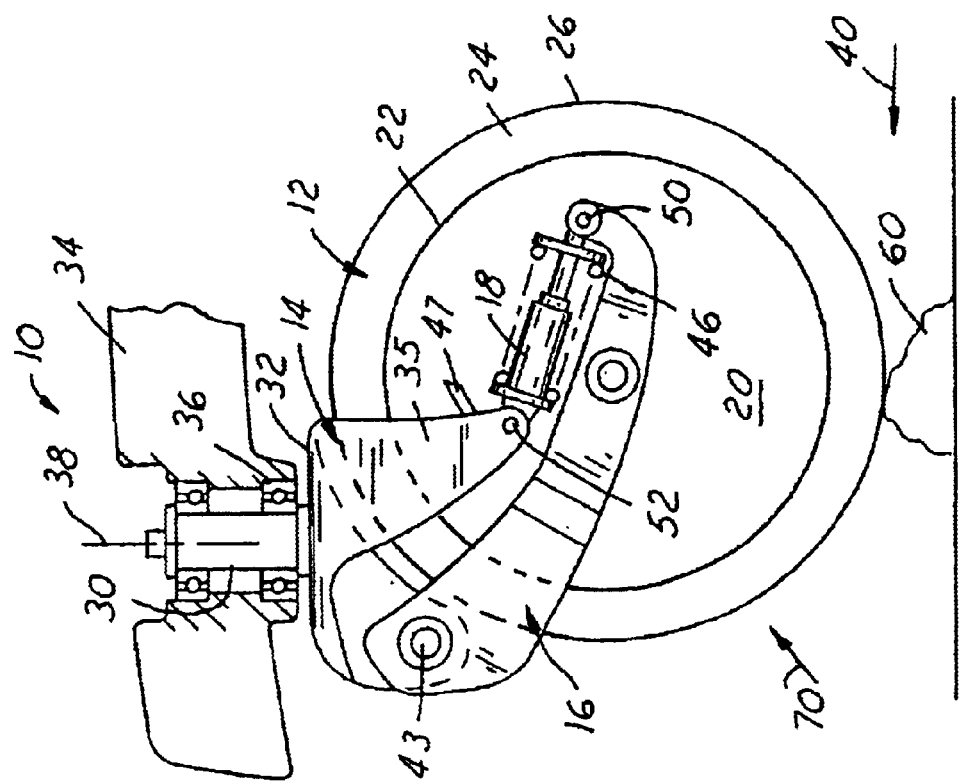
FIG. 2 is a schematic side view of a dolly wheel suspension system in accordance with a preferred embodiment of the present invention.
Figure 3:
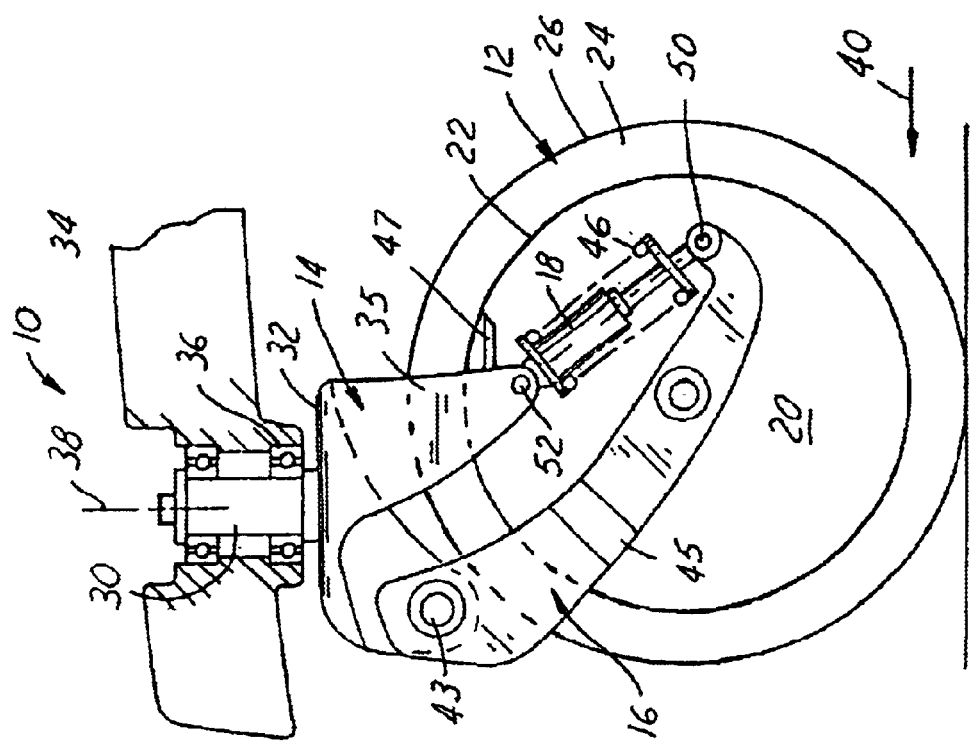
FIG. 3 is a schematic side view of the dolly wheel suspension system of FIG. 2 illustrating the operation of the suspension system when the wheel is subjected to an impact force in accordance with a preferred embodiment of the present invention.

Referring now to FIGS. 1 to 3, which illustrate a wheel suspension system 10 in accordance with a preferred embodiment of the present invention. As will be understood, the wheel suspension system 10 is preferably intended for use with a dolly wheel that provides, what are termed in the art, zero turn capabilities. However, it will be understood that the disclosed wheel suspension system can be utilized with other types of wheels, including wheels that are fixed and have controlled steering capabilities. Additionally, the disclosed suspension system is preferably incorporated into a vehicle, such as an automotive vehicle, a trailed vehicle, or a mobility vehicle. The dolly wheel suspension system 10 includes a dolly wheel 12, a dolly wheel spindle assembly 14, a wheel carrier arm 16, and a shock absorber 18.

The dolly wheel 12 includes a wheel rim 20 having an outer periphery 22. A tire 24 is disposed around the outer periphery 22 of the wheel rim 20 and is secured to the wheel rim 20. The tire 24 has an outer periphery 26, which is intended to engage the ground. The wheel rim 20 has a wheel hub 28 secured thereto, as would be clearly understood by one of skill in the art. The tire 24 is preferably configured for off road capability.

The dolly wheel spindle assembly 14 includes an upwardly extending pin portion 30 which is secured to a top portion 32, which extends over top of the tire 24. The pin portion 30 is secured to a support portion 34 (FIG. 2) of a vehicle. The pin portion 30 of the dolly wheel spindle assembly 14 is secured through at least one bearing 36 to the support portion 34. The dolly wheel spindle assembly 14 is thus free to spin about a dolly wheel spindle axis 38 to respond to the direction of travel of a vehicle.

The dolly wheel spindle assembly 14 preferably carries all of the suspension components in the direction of travel of the wheel and of the end of the vehicle, as generally indicated by the arrow 40. The wheel carrier arm 16 is pivotally connected to the top portion 32 of the dolly wheel spindle assembly 14 by a pin 42 to define a pivot point 43 thereat. The pivot point 43 allows the wheel carrier arm 16 to pivot with respect to the dolly wheel spindle assembly 14, as required. The wheel carrier arm 16 is secured to the shock absorber 18, which carries a spring 46 to maintain the wheel carrier arm 16 in a secure and load carrying position with respect to the dolly wheel spindle assembly 14. The wheel carrier arm 16 is also secured to the wheel hub 28 by a bearing shaft 44.

The wheel carrier arm 16 preferably has a bend 45 formed therein to allow a portion of the wheel carrier arm 16 and the shock absorber 18 to fit inside the wheel rim 20. In this configuration, inside means that at least a portion of the wheel carrier arm 16 as well a portion of the shock absorber 18 are located within the wheel rim 20 when the dolly wheel 12 is viewed from the front. In other words, the bend 45 locates a portion of the wheel carrier arm 16 and the shock absorber 18 inside the outermost side portion of the tire 24 or in the volume defined by the wheel rim. The dolly wheel spindle assembly 14 also includes an extending portion 47 that is also preferably constructed to function as a mud scraper within the wheel rim 20.

The shock absorber 18 is preferably a spring shock and includes the spring 46. The shock absorber 18 is preferably set for operating load and acts in compression. As will be understood, the shock absorber 18 thus urges the wheel carrier arm 16 downwardly and forwardly such that the dolly wheel 12 engages the ground. The shock absorber 18 is secured to the wheel carrier arm 16 and to the dolly wheel spindle assembly 14 by a plurality of securing bolts 48. The shock absorber 18 has a first end 50 that is secured to the wheel carrier arm 16 and a second end 52 that is secured to a flange portion 35. The flange portion 35 extends downwardly from the top portion 32 of the dolly wheel spindle assembly 14. The first end 50 of the shock absorber 18 is preferably pivotally secured to the wheel carrier arm 16. Similarly, the second end 52 of the shock absorber 18 is preferably pivotally secured to the dolly wheel spindle assembly 14.

As shown, the suspension system 10 is preferably provided such that the shock absorber 18 is located within the outer periphery 26 of the tire 24. More preferably, the shock absorber 18 is located within the outer periphery 22 of the wheel rim 20. Additionally, at least a portion of the wheel carrier arm 16 is located within the outer periphery 22 of the wheel rim 20. Preferably, a substantial portion of the wheel carrier arm 16 is located within the outer periphery 22 of the wheel rim. The dolly wheel 12 and the wheel rim 20 are preferably of a sufficient diameter to accommodate the suspension needed by the vehicle.

It will be understood that it is also possible to locate the wheel carrier arm 16 either within the outer periphery 22 of the wheel rim 20 or outside the outer periphery 26 of the tire 24, depending on packaging needs. Moreover, the pivot point 43 for the wheel carrier arm 16 can be positioned outside the outer periphery 26 of the tire 24 and the wheel rim 20 for more linear path of the dolly wheel 12 and thus a greater length of suspension travel.

In the embodiment shown in FIGS. 1 through 3, a substantial portion of the wheel carrier arm 16 is located within the periphery of the wheel rim 20. Moreover, the suspension system 10 is located below the dolly wheel spindle axis 38. The suspension operates equally in all directions of vehicle motion with the turning of the dolly wheel 12 to the direction of travel. This is because the dolly wheel 12 spins toward its direction of travel, thereby taking the suspension system 10 with it in that direction of travel. It will be understood that when utilized on a vehicle, a pair of dolly wheels will preferably be utilized. The operation of each dolly wheel and its associated suspension is preferably the same and thus the description of the structure and operation of one will apply equally to the operation of the other.

Referring now to FIG. 3, which illustrates the operation of the suspension system 10 in accordance with the present invention. As shown, when the tire 24 contacts a bump or rock 60 in the road or ground, a force can impact the tire 24, which results in upward and rearward motion, as generally indicated by arrow 70, in such a manner as to absorb forward motion impact. This upward and rearward motion is shown in FIG. 3. In order to effectuate this motion, the wheel carrier arm 16 rotates about the pivot point 43 and the shock absorber 18 compresses against the force of the spring 46. Moreover, because the shock absorber 18 is pivotal about its first end 50 and its second end 52, it can rotate during compression to accommodate for the length of travel of the wheel carrier arm 16.

Figure 6:
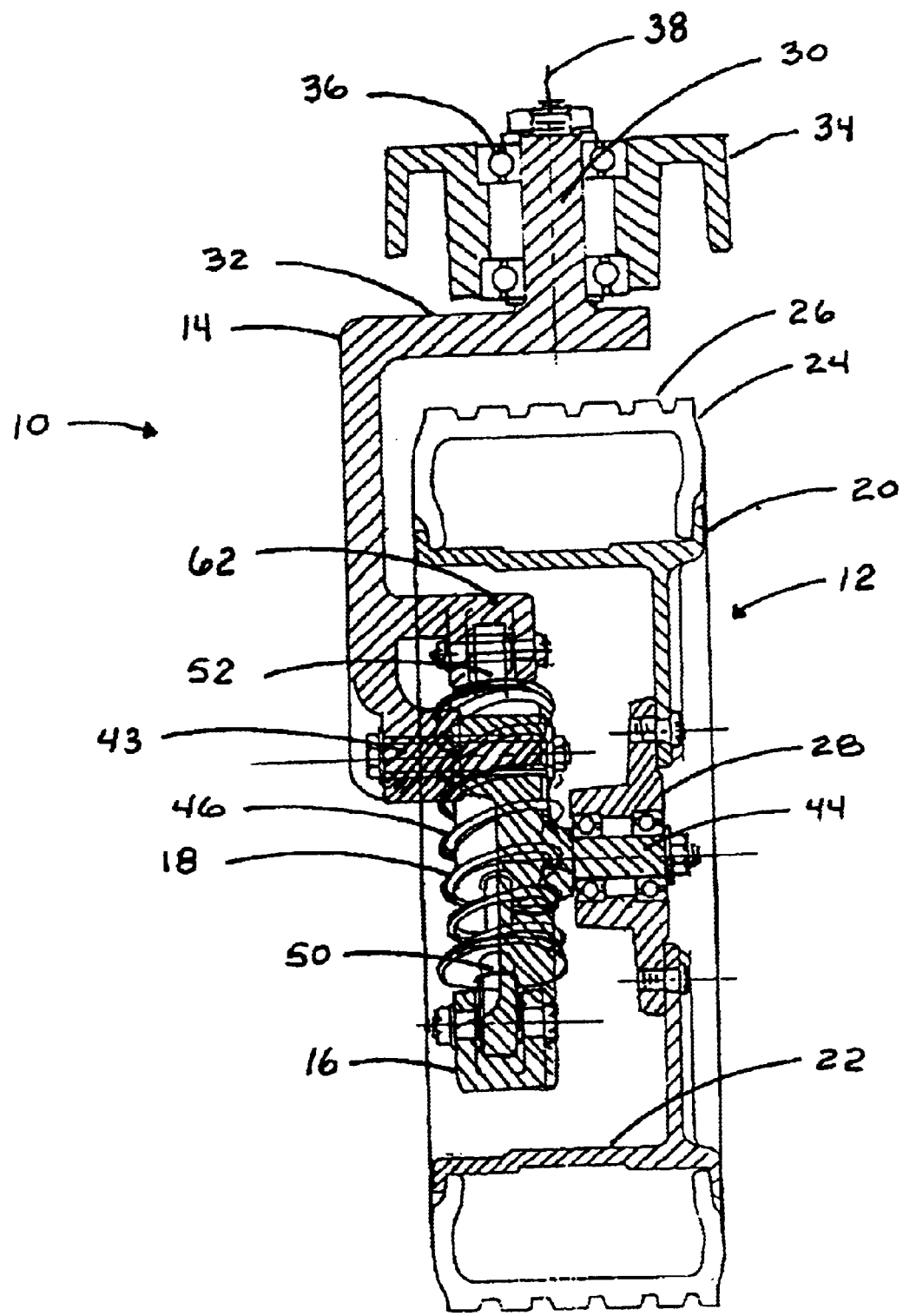
FIG. 6 is cross-sectional front view of the dolly wheel suspension system of FIG. 4 in accordance with a preferred embodiment of the present invention.

Referring now to FIGS. 4 through 6, which illustrate another embodiment of the suspension system 10 in accordance with the present invention. In the embodiment shown in FIG. 4, the dolly wheel spindle assembly 14 and the wheel carrier arm 16 are configured differently than the embodiment shown in FIGS. 2 to 3. As shown in FIG. 4, the flange portion 35 of the dolly wheel spindle assembly 14 extends further downwardly than in the embodiment of FIGS. 2 and 3 such that its axis pin 43, rotatably securing the wheel carrier arm 16 is located within the outer periphery 26 of the tire 24. With this configuration, the pivot point determined by axis pin 43 is located within the outer periphery 22 of the wheel rim 20. Moreover, the first end 52 of the shock absorber 18 is pivotally secured to an extension portion 62 that is integrally formed with the dolly wheel spindle assembly 14.

FIG. 5 illustrates the operation of the suspension system 10 of FIG. 4. The operation of the suspension system 10 is substantially the same as in the embodiment described above in connection with FIGS. 1 through 3. Specifically, when the tire 24 contacts a bump or rock 60 in the road or ground, a force can impact the tire 24, which results in upward and rearward motion in such a manner as to absorb forward motion impact. In order to effectuate this motion, the wheel carrier arm 16 rotates about the pivot point 43 and the shock absorber 18 compresses against the force of the spring 46. Moreover, because the shock absorber 18 is pivotal about its first end 50 and its second end 52, it can rotate during a compression to accommodate the travel of the wheel carrier arm 16.

FIG. 6 illustrates the wheel carrier arm 16 and the shock absorber 18 being located within an area or volume defined by the wheel rim 20. Thus, as shown, in the front view, the shock absorber 18 and the wheel carrier arm 16 are located within the area defined by the wheel rim 20. Similarly, the wheel carrier arm 16, the axis pin 43, and the shock absorber 18 are located within the outer periphery 22 of the wheel rim 20 when viewed from the side view.

Figure 7:
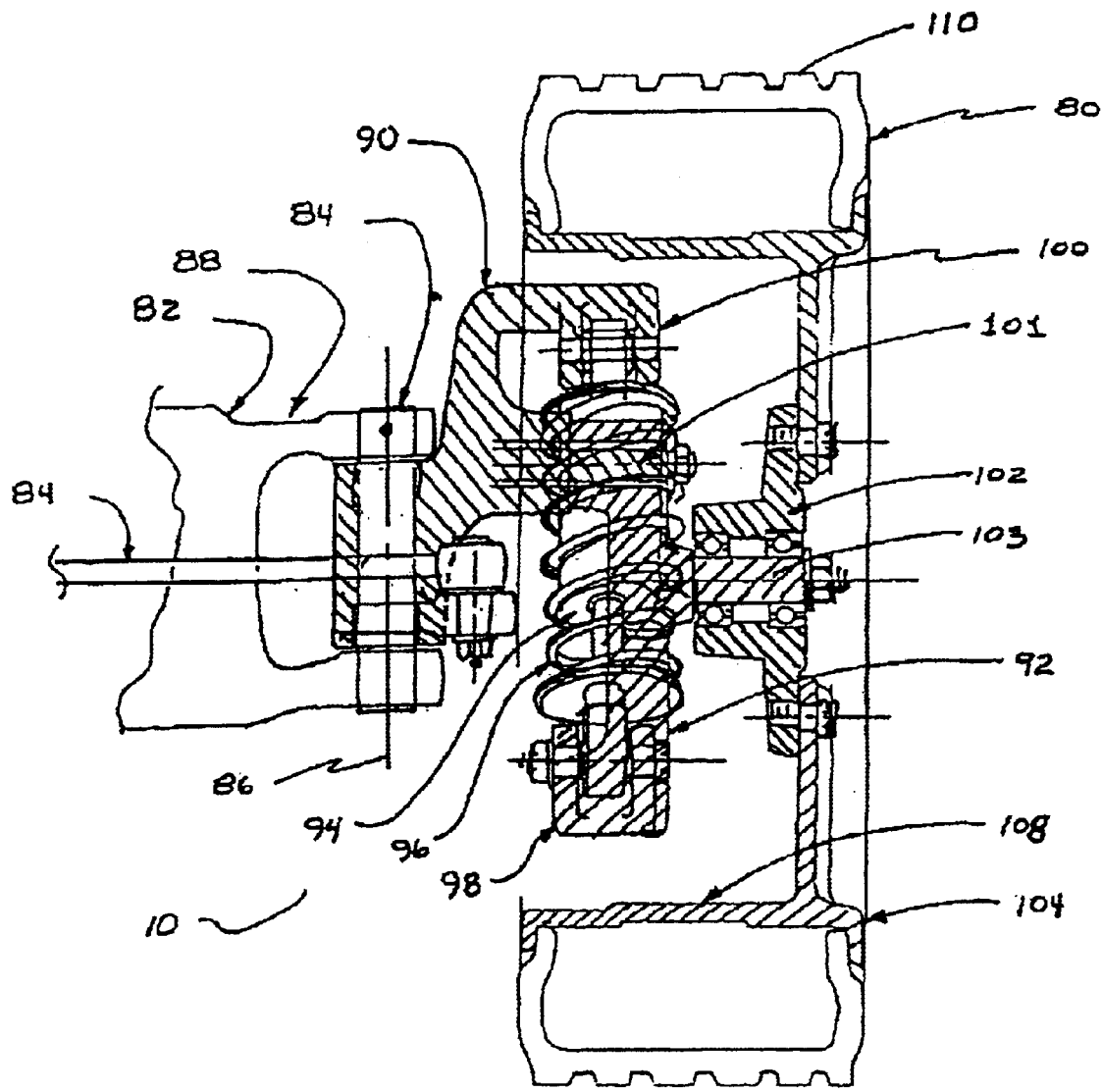
FIG. 7 is a cross-sectional front view of a standard steer wheel suspension system utilizing the general suspension components as shown in FIGS. 4 and 5 in accordance with a preferred embodiment of the present invention.
Figure 8:
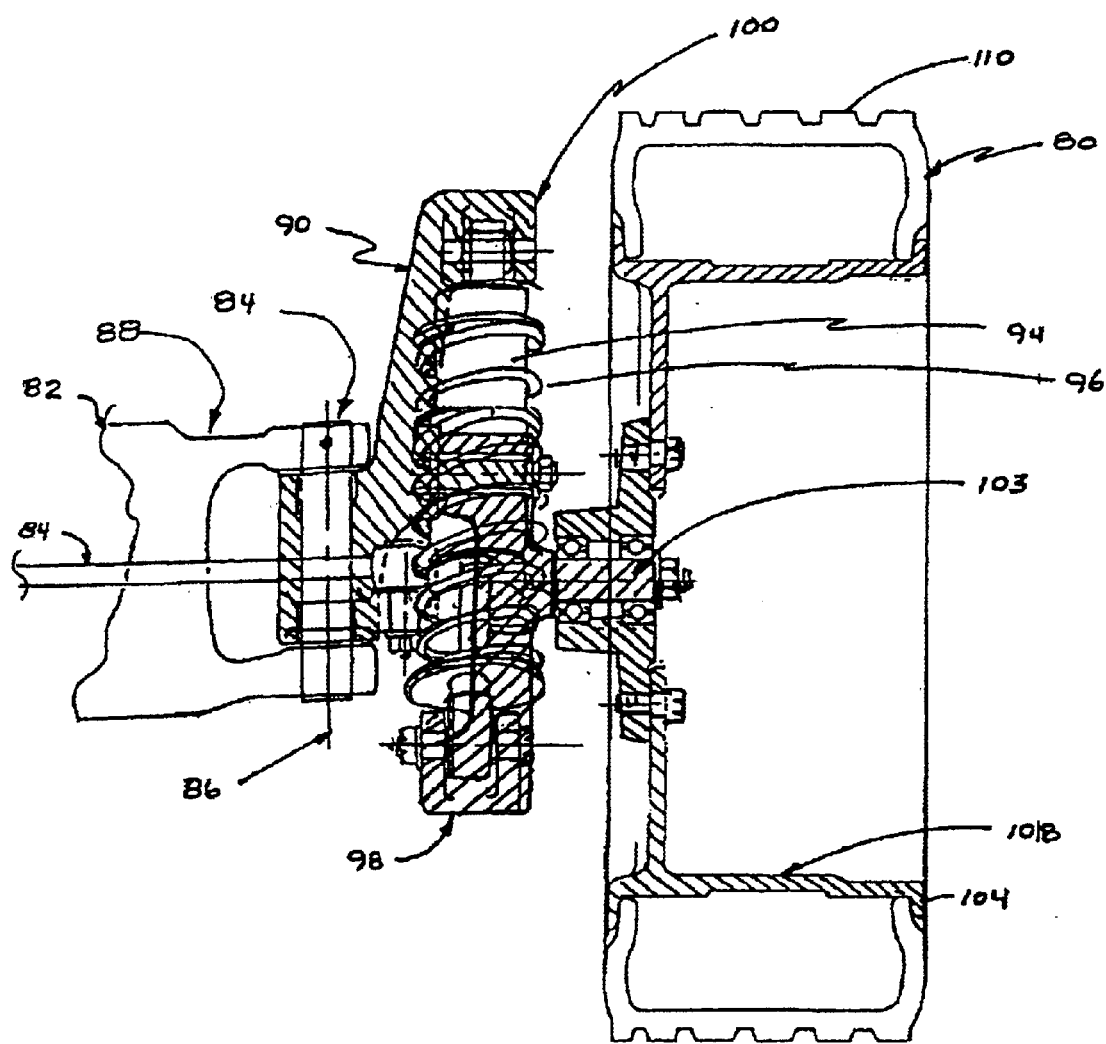
FIG. 8 is a schematic front view of a standard wheel suspension system utilizing the general suspension components of FIG. 2 and FIG. 3 in accordance with a preferred embodiment of the present invention.

FIGS. 7 and 8 illustrate alternative embodiments of the preferred suspension system 10 for use with a standard steering system. As shown, a tire 80 is secured to a vehicle frame 82. The vehicle frame 82 includes a tie rod 84 extending therefrom to effectuate standard steering. The vehicle frame 82 includes a vehicle king ping 84 secured thereto. The king pin 85 includes a generally vertical axis of rotation 86. The king pin 85 is in communication with an assembly 88 of the vehicle frame 82 for securing a wheel carrier 90. The wheel carrier 90 has a wheel carrier arm 92 pivotally secured thereto on axis 101. A shock absorber 94 and associated spring 96 is disposed between one end 98 of the wheel carrier arm 92 and an upper end 100 of the wheel carrier 90. The wheel carrier arm 92 is secured to a wheel hub 102 on an axis 103, as will be understood by one of skill in the art. The operation of the suspension system 10 for the standard steering, as illustrated in FIGS. 7 and 8, is the same as described above in connection with dolly wheel steering.

In the embodiment shown in FIG. 7, the wheel carrier arm 92 and the shock absorber 94 are located entirely within the area or volume defined by the wheel rim 104. Thus, as shown, in the front view, the shock absorber 94 and the wheel carrier arm 92 are located within the area defined by the wheel rim 104. Similarly, the wheel carrier arm 92, the axis pin 101, and the shock absorber 94 are located within the outer periphery 108 of the wheel rim 104 when viewed from the side view. In the embodiment shown in FIG. 8, the wheel carrier arm 92 and the shock absorber 94 are located entirely outside the tire 80 and the wheel rim 104 in the front view. However, the wheel carrier arm 92 and the shock absorber 94 are located inside the outer periphery 110 of the tire 80 when viewed from the side view.

In accordance with the above, the suspension system 10 has maximum ability in all directions of the vehicle steer condition. Further, the angle of the king pin axis 86 does not change with movement of the suspension system 10. The disclosed suspension system 10 provides a compact, cost effective design and in particular is an excellent, well-packaged suspension for a mobility vehicle. It will be appreciated that a free acting dolly wheel 12, as shown in FIGS. 1 through 6, with this suspension system 10 could also be controlled to effectuate fully controlled steering with the use of the suspension system described herein. Alternatively, the disclosed suspension system 10 could be used with a standard wheel, as disclosed in FIGS. 7 and 8, rather than a dolly wheel.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. A wheel suspension system for a vehicle, comprising:
   a vehicle wheel having a wheel rim
   an assembly rotatably securable to the vehicle, said assembly rotatably securing said vehicle wheel to the vehicle, said assembly being rotatable around a vertical axis;
   a wheel carrier arm pivotally secured to said assembly to define a pivot point, such that said vehicle wheel and said wheel carrier arm rotate together about an axis of rotation defined by said pivot point;
   a shock absorption device in communication with said wheel carrier arm and said assembly, said shock absorption device being located within an interior volume defined by said wheel rim, such that said shock absorption device is hidden when said vehicle wheel is viewed from a front direction; and wherein said shock absorption device is located generally rearwardly of said axis of rotation and compresses upon an impact force contacting said vehicle wheel.

2. The system of claim 1, wherein said vehicle wheel is a dolly wheel having zero turn capabilities.

3. The system of claim 2, wherein said an end of said wheel carrier arm is pivotally secured to said assembly.

4. The system of claim 1, wherein said wheel carrier arm has a depending bend to allow at least a portion of said wheel carrier arm to lie inside said wheel rim with said shock absorption device when viewed from the front.

5. The system of claim 4, wherein said pivot point is located outside an outer periphery of said vehicle wheel.

6. The system of claim 4, wherein said pivot point is located outside said wheel rim and outside an outer periphery of said wheel.

7. The system of claim 1, wherein said wheel carrier arm is located entirely inside said wheel rim of said vehicle wheel when viewed from the front.

8. The system of claim 2, wherein a portion of said wheel carrier arm is located outside an outer periphery of said dolly wheel.

9. A dolly wheel suspension system for a vehicle, comprising:
   a dolly wheel having an outer periphery, said dolly wheel having zero-turn capabilities;
   a dolly wheel spindle assembly rotationally securable to a frame portion of the vehicle, said dolly wheel spindle assembly defining an axis of rotation that is generally vertical to ground;
   a wheel carrier arm pivotally secured to said dolly wheel spindle assembly, said dolly wheel spindle assembly defining an axis of rotation for said wheel carrier arm and said dolly wheel that is generally horizontal to ground; and
   a shock absorber having an integral spring and including a first end and a second end said first end of said shock absorber being directly connected to one end of said wheel carrier arm, said second end of said shock absorber being in communication with a portion of said dolly wheel spindle assembly;
   wherein said shock absorber is located at all times within an area defined by said outer periphery of said dolly wheel when viewed from the side.

10. The system of claim 9, wherein said second end of said shock absorber is pivotally secured to a portion of said dolly wheel spindle assembly.

11. The system of claim 9, wherein said wheel carrier arm and said dolly wheel are configured to pivot rearwardly and upwardly about said horizontal axis of rotation.

12. The system of claim 11, wherein said shock absorber is intended to compress as said wheel carrier arm and said dolly wheel pivot rearwardly and upwardly about said horizontal axis of rotation.

13. The system of claim 9, wherein said dolly wheel includes a wheel rim and wherein said shock absorber is located at all times within an area defined by an outer periphery of said wheel rim when viewed from the front.

14. The system of claim 13, wherein said shock absorber is located at all times within an area defined by said outer periphery of said wheel rim when viewed from the side.

15. The system of claim 9, wherein said wheel carrier arm includes a inward bend such that a portion of said wheel carrier arm and said shock absorber are located within said wheel rim when viewed from the front of said dolly wheel.

16. The system of claim 9, wherein said entire wheel carrier arm and said shock absorber are at all times located within said wheel rim when viewed from the front of said dolly wheel.

17. The system of claim 9, further including a mud scraper intended to communicate with a wheel rim of said dolly wheel, said mud scraper being located within an area defined by an outer periphery of said wheel rim.

18. The system of claim 17, wherein said mud scraper is secured to said dolly wheel spindle assembly.

19. A suspension system for a vehicle, comprising:
   a vehicle wheel having a wheel rim and a tire secured around an outer periphery of said wheel rim;
   a spindle assembly communicable with a frame portion of the vehicle, said frame portion including a portion overlying said vehicle wheel;
   a wheel carrier arm having a first end and a second end, said wheel carrier arm being connected by a said first end to said spindle assembly at a pivot point such that said wheel carrier arm can pivot about an axis of rotation defined by said pivot point; and
   a shock absorption device rotatably secured at a lower end to said second end of said wheel carrier arm, said shock absorption device intended to compress when said vehicle wheel is subjected to an impact force which causes said vehicle wheel to move upwardly and rearwardly with respect to said spindle assembly about said axis of rotation
   wherein said shock absorption device is located entirely within said wheel rim when viewed from the front.

20. The system of claim 19, wherein said shock absorption device has an upper end which is secured to a flange portion of said spindle assembly.

21. The system of claim 19, wherein said vehicle wheel is a dolly wheel having zero turn capabilities.

22. A suspension system for a vehicle, comprising:
   a vehicle wheel having a wheel rim and a tire secured around an outer periphery of said wheel rim;
   a spindle assembly in communicable with a frame portion of the vehicle, said frame portion including a portion overlying said vehicle wheel;
   a wheel carrier arm having a first end and a second end, said wheel carrier arm being connected by a said first end to said spindle assembly at a pivot point such that said wheel carrier arm can pivot about an axis of rotation defined by said pivot point; and
   a shock absorption device rotatably secured at a lower end to said second end of said wheel carrier arm, said shock absorption device intended to compress when said vehicle wheel is subjected to an impact force which causes said vehicle wheel to move upwardly and rearwardly with respect to said spindle assembly about said axis of rotation
   wherein said shock absorption device is located entirely within said wheel rim when viewed from the side.

* * * * *